Nov. 6, 1928.
J. F. D. HOGE
1,690,297
CABLE SUPPORT
Filed Sept. 28, 1923
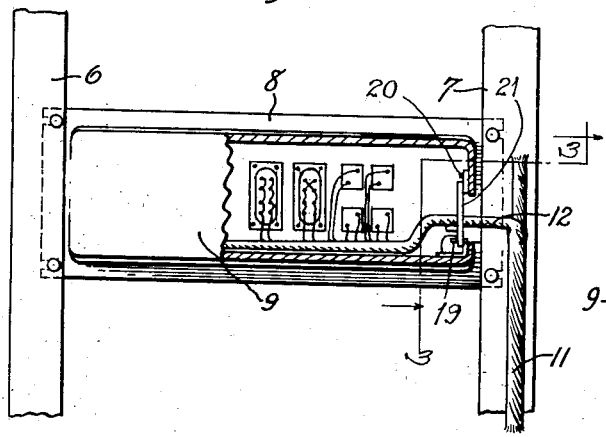
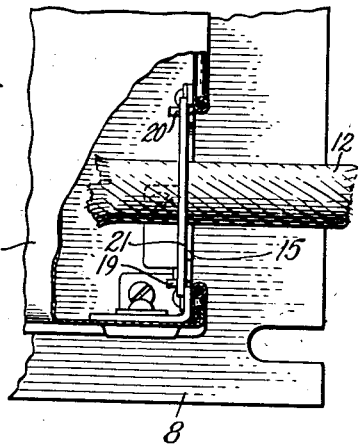
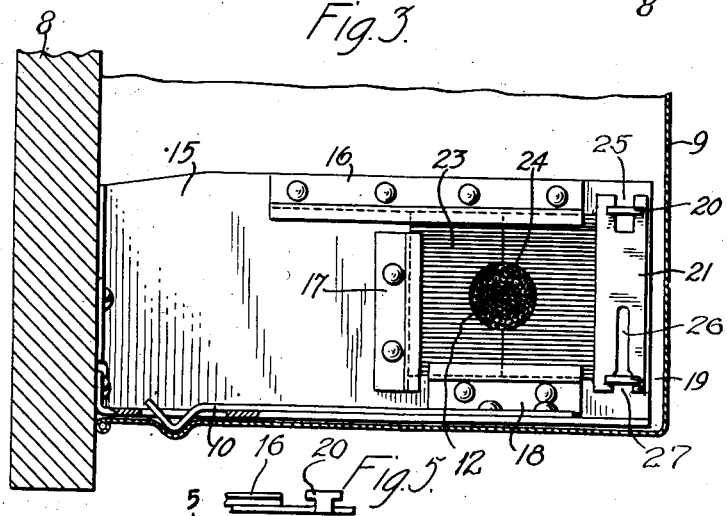
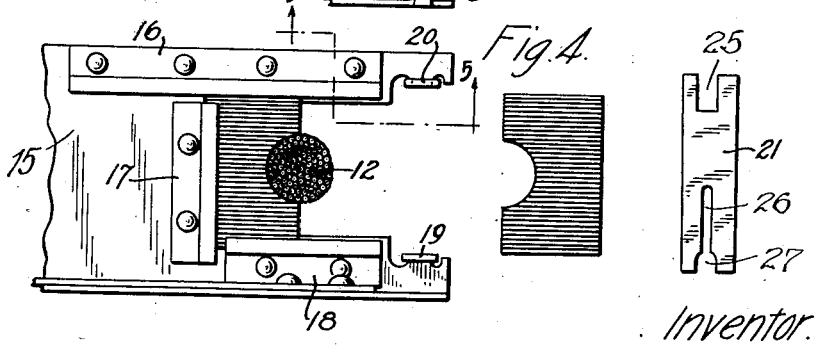
Inventor:
Joseph F. D. Hoge
by ____, Atty.

Patented Nov. 6, 1928.

1,690,297

UNITED STATES PATENT OFFICE.

JOSEPH F. D. HOGE, OF NEW YORK, N. Y., ASSIGNOR TO WESTERN ELECTRIC COMPANY, INCORPORATED, OF NEW YORK, N. Y., A CORPORATION OF NEW YORK.

CABLE SUPPORT.

Application filed September 28, 1923. Serial No 665,498.

This invention relates to clamping devices and particularly to a support for an electrical cable or other electrical conductors.

An object of the invention is a cable clamping device which is simple, efficient and inexpensive to manufacture and which may be applied expeditiously.

In accordance with the perferred form, the invention contemplates a cable clamping device consisting of a bracket having a slot in one end, members secured near the edges of said slot to form grooves, a pair of clamping members fitting in said grooves and cut when assembling to cooperate to form an opening of a diameter substantially the same size as the cable to be supported, lugs being provided on the outer clamping member with which a slotted clip engages to clamp the cable firmly in place.

Referring now to the drawings, Fig. 1 shows a portion of a rear view of a rack having a panel or mounting plate mounted thereon together with a cable the support for which is the subject of this invention.

Fig. 2 is an enlarged view of the lower right hand corner of Fig. 1 with a portion of the cover of the mounting plate broken away to show the clamping device.

Fig. 3 is an enlarged sectional view taken along the line 3—3 of Fig. 1.

Fig. 4 is a partial view of the cable support showing the clamping members disassembled.

Fig. 5 is a partial view of Fig. 4 taken along the line 5—5.

A better understanding of the invention may be had from the following description when taken in conjunction with the accompanying drawings.

Referring now for the moment to Fig. 1 a pair of supports 6 and 7 is shown having fastened thereto a panel 8 or other suitable apparatus supporting means. Enclosing the apparatus mounted on the panel 8 is a metal cover 9 which has as shown in Fig. 2 a portion thereof slotted and which is fastened to the panel 8 by means of brackets located near each corner of the panel 8. Each of these brackets has spring members 10 which engage depressions in the cover 9 as shown in Fig. 3. Extending upwardly along the support 7 is a cable 11 having a branch cable 12 leading therefrom to the apparatus mounted on the panel 8. It is the fastening means for the branch cable 12 which this invention concerns and which will now be described.

Referring to Fig. 3 one of the brackets previously mentioned has a slotted face plate 15 on the three sides of the slot, there being riveted angle members 16, 17 and 18 forming suitable grooves. Integral with the free ends of the face plate 15 and turned at right angles to the surface thereof are a pair of T-shaped projections 19 and 20, which serve as holding means for a clip 21. The clip 21 as shown in Fig. 4 is provided at opposite ends with slots 25 and 26. Slot 25 being slightly wider than slot 26 is arranged to engage the lug or T shaped member 20. Slot 26 which is quite narrow and extends approximately half way into the clip 21 is provided with an enlarged opening 27 which engages the lug or T shaped member 19. The purpose of the long slot 26 is to give a spring action to the lower part of the clip 21 when it is forced down over the member 19.

In order that the pressure which the clip 21 exerts against the plate 23 may be varied, the slots 25 and 26 in the clip 21 are decentered. This construction permits the clip 21 to be inserted in either of two positions, according to the amount of discrepancy in the fiber plate 23.

Adapted to be slid in the grooves formed by the angle members 16, 17 and 18 is a fibre plate 23 which has an aperture 24 cut when assembling to substantially the size of the cable to be clamped. The fibre plate 23 is cut along its center line, thus permitting the separation of the two halves of the fibre plate, and serving, as will be presently described, as a clamping means for the cable.

With one-half of the fibre plate 23 inserted in the grooves as shown in Fig. 4 and the cable resting in the aperture thereof, the other half of the fibre plate may now be slid in the grooves, whereupon it will engage the cable. Now to securely hold these various parts in position, the clip 21 is fastened by means of the T-shaped projections 19 and 20 by first inserting the slot 25 in the clip 21 on the T-shaped projection 20 and moving it up as far as possible which now permits the forcing down of the clip 21 so that the enlarged opening 27 of the slot 26 is caused to snap over the T-shaped projection 19. It is thus seen that with these parts in place and since the aperture in the fibre plate 23 is substantially the same size, if not a trifle smaller than the diameter of the cable to be clamped, the cable will be securely fastened and will not require the use of any additional fastening means.

What is claimed is:

A cable support comprising a plate having a slot in one end, members secured near the edges of the slot to form grooves, a pair of clamping members fitted in said grooves and arranged to form an opening of a diameter substantially the same as the cable to be supported, lugs on the outer end of said plate, and a clip in the plane of said clamping members, when the clip and clamping members are in operative position, said clip having a slot in each end engaging said lugs to hold the outer clamping member firmly against the cable.

In witness whereof, I hereunto subscribe my name this 19th day of September A. D., 1923.

JOSEPH F. D. HOGE.